Sept. 18, 1962   J. ROSÁN   3,054,436
INSERT AND SCREW LOCKED BY SINGLE SPLIT LOCK RING
Filed April 9, 1957
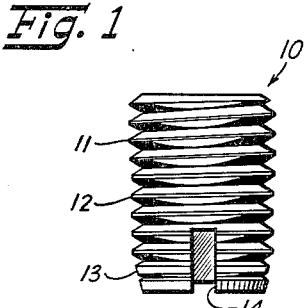
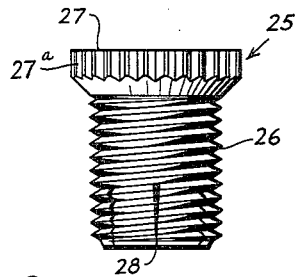
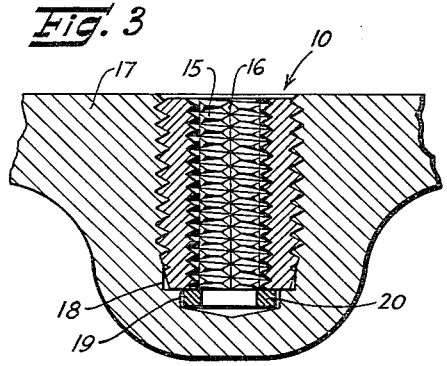
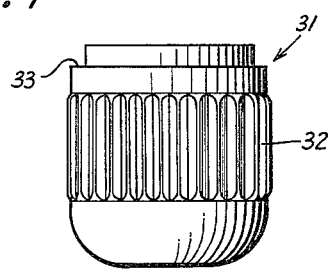
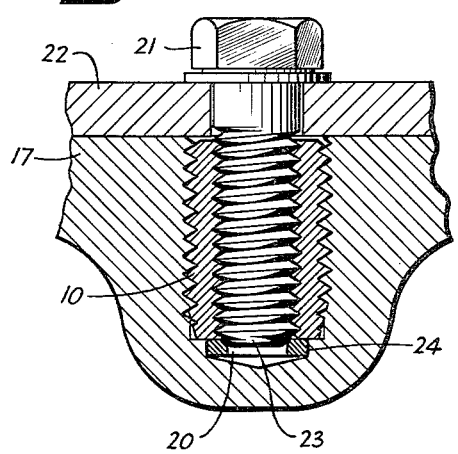
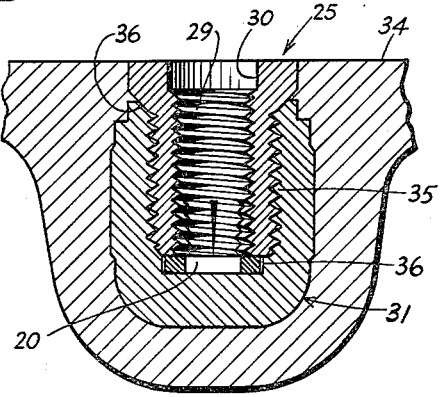
INVENTOR.
José Rosán
BY
ATTORNEY

United States Patent Office 3,054,436
Patented Sept. 18, 1962

3,054,436
INSERT AND SCREW LOCKED BY SINGLE SPLIT LOCK RING
José Rosán, Newport Beach, Calif., assignor to Rosan Engineering Corp., Newport Beach, Calif., a corporation of California
Filed Apr. 9, 1957, Ser. No. 651,672
1 Claim. (Cl. 151—36)

This invention relates to insert units, particularly for application to relatively soft material and thin walled structures.

The general purpose and objective of the invention is to provide a novel and improved insert unit which is particularly designed so as to be mounted, cast, or molded or otherwise secured in relatively soft, or plastic, or thin walled material such as mounting flanges, rings or frames such as are used in fuel and oil cells in military and commercial aircraft combat tanks and other vehicles.

A more particular object of the invention is to provide a novel improved insert unit of the character described wherein danger of damage to the thin wall of the structure in which it is mounted will be minimized if the associated securing bolts are tightened excessively or are of excessive length.

More particular objects and advantages of the invention will appear and be brought out more fully in the following specification reference being had to the accompanying drawing wherein:

FIGURE 1 is a side view of an insert embodying a preferred form of the present invention.

FIGURE 2 is a lock ring associated with the insert of FIGURE 1.

FIGURE 3 is a view in section showing the insert and lock ring of FIGURES 1 and 2 positioned in a parent body or work piece.

FIGURE 4 is a view similar to FIGURE 3 showing a retaining bolt and complementary work piece secured to the parent body of FIGURE 3.

FIGURE 5 is a view similar to FIGURE 1 showing a modified form of insert.

FIGURE 6 is a view similar to FIGURE 2 showing the lock ring associated with the insert of FIGURE 5.

FIGURE 7 is a side view of a cap or socket element which receives the insert and lock ring of FIGURES 5 and 6.

FIGURE 8 is a view similar to FIGURE 3 showing the insert lock ring and cap element of FIGURES 5 to 7.

Referring more particularly to the drawing, the numeral 10 designates generally a self tapping insert of the type shown in my copending application, Serial No. 618,594 and now abandoned. This insert has external threads 11 of standard form, a plurality of threads 12 that are truncated, and a beveled end 13 that is longitudinally slotted at 14 forming thread cutting teeth. This insert also has an internally threaded bore 15 which is formed with a plurality of longitudinal grooves 16 to receive a correspondingly shaped setting tool.

FIGURE 3 shows a work piece or parent body 17 of relatively soft material, such as aluminum, cast iron, magnesium, plastic or the like, having a blind bore or shallow socket 19, and a counterbore 18 in which threads are adapted to be cut by the cutting teeth on the insert 10. The outer end of the socket 19 terminates in a flat, transversely extending, annular shoulder that forms the bottom of the counterbore 18. The socket 19 is adapted to receive a ring 20 which is preferable of a hardened split type and being of a spring material. Ring 20 has a cross-sectional thickness which is about equal to the depth of the socket 19, and has an external diameter which is slightly less than the diameter of the socket 19 and the outer diameter of the insert 10, and has a bore or aperture, the internal diameter of which is less than the patch diameter of threads 15 and the threads of a bolt or screw member 21 which is to be run into the insert for securing a cover plate or other element 22 to the work piece or parent body 17, all as shown in FIGURE 4. Screw 21 is preferably formed with a taper or bevel 23 at its inner end.

FIGURES 3 and 4 show the operation of the invention as thus far described. The lock ring 20 is first positioned or placed in the bore or socket 19 of the parent body 17. As shown in FIG. 2, the split lock ring 20 is provided with the conventional offset free ends. In the uncompressed state of the lock ring, the offset free ends occupy an axial space which is substantially greater than the depth of the socket 19. The insert 10 is run in counterbore 18, which is a self tapping operation, until the inner flat end face thereof engages the shoulder and the split lock ring, so that the ring 20 is axially compressed and is secured in the socket 19 by the pressure of the inner end of the insert thereagainst, which also locks the insert against rotary movement relative to the body 17. The screw member 21 is then run in the insert 10 through an appropriate hole in the plate element 22 and when tightened, the inner beveled end 23 thereof will extend into the aperture of ring 20 and, upon further tightening of the screw member, the ring will expand radially and engage the side wall of the socket 19 (FIG. 4) and transmit the load pressure radially and minimize the likelihood of damage to the relatively thin wall of parent body 17 of axially or longitudinally directed forces, whereby the axial, and radially inward, force of the ring 20 acts to lock the screw member 21 and the insert 10 against rotary movement relative to the body 17.

FIGURES 5 to 8 show a modified form of the invention wherein an insert 25 has external threads 26 and an enlarged head 27 the peripheral portion of which is formed with serrations 27a. The inner end of the insert is slotted at 28 forming a plurality of segments and the insert has a threaded bore 29 and a plain counterbore 30. A cap member 31 has external serrations 32 and an annular shoulder 33 for anchoring against rotation and longitudinal displacement when molded in a body of parent material or other work piece 34. Cap 31 has internal threads 35 and a blind bore or socket 36 having a flat bottom portion in which blind bore the lock ring 20 may be positioned. Head 27 is beveled as shown, and cap 31 may have a correspondingly beveled upper end 36 for sealing engagement with the head 27 of the insert.

In the operation of the modified form of the invention, the parent body 34 is formed with cap 31 molded or cast therein. The insert 25 is then threadedly run in the bore of the cap, a lock ring 20 having previously been inserted in the counterbore or socket 36. The segments formed by slots 28 will have been previously pressed inwardly so as to effect an interference fit with the inner end of a screw member such as screw 21 when run in threaded bore 29 of the insert. The screw, when engaging the lock ring 20, will effect a binding engagement therewith, as in the modification of FIGS. 1–4, and inadvertent loosening of the screw, due to vibration or impact, will be prevented. Also, the axial load on the screw will be distributed in part radially, such that damage to the cap or the parent body 34 will be minimized or prevented.

I claim:

In combination, a body having a threaded bore and a shallow socket at the inner end of said bore, said socket having a flat bottom portion and an outer end that terminates in an annular shoulder that forms the bottom of said threaded bore; a resilient, split lock ring resting on the flat bottom portion of said socket, the axial cross-sectional thickness of said split lock ring being about equal to the depth of said socket, said split lock ring having axially offset free ends which in their uncompressed state occupy an axial space substantially greater than the depth of said socket; an externally and internally threaded hollow insert having an inner, flat end face, said insert being mounted in said threaded bore and axially compressing said free ends of said split lock ring sufficiently to effect seating of said flat inner end face against said shoulder, the outside and inside diameter of said split lock ring being respectively smaller than the outside and inside diameter of said insert, the outside diameter of said split lock ring also being substantially smaller than the diameter of said socket to permit said ring to be expanded radially by a bevel-end screw fastener; and a fastener mounted in said insert having a bevel-end screw threaded shank engaging the inner upper edge of said split lock ring axially compressing and radially expanding said ring, whereby the axial, and radial inward, force of said ring acts to lock said fastener and insert against rotary movement relative to said body.

References Cited in the file of this patent
UNITED STATES PATENTS

| | | |
|---|---|---|
| 1,757,857 | Garrett | May 6, 1930 |
| 1,895,845 | D'Halloy | Jan. 31, 1933 |
| 2,400,348 | Greene | May 14, 1946 |
| 2,407,586 | Summers | Sept. 10, 1946 |